Patented Apr. 16, 1940

2,197,707

UNITED STATES PATENT OFFICE 2,197,707

CATALYST AND PROCESS FOR ITS PRODUCTION

Eugene D. Crittenden, Syracuse, N. Y., assignor, by mesne assignments, to The Solvay Process Company, New York, N. Y., a corporation of New York No Drawing. Application December 9, 1929, Serial No. 412,927

13 Claims. (Cl. 23—212)

This invention relates to catalysts for use in carrying out chemical reactions between gases and processes for producing the same. More particularly, this invention relates to an iron oxide catalyst for the production of hydrogen and carbon dioxide by the reaction of carbon monoxide and water vapor, and a method of preparation of the catalyst.

As heretofore carried out, the production of iron oxide, for example iron oxide-magnesium oxide catalysts for the reaction between carbon monoxide and steam has involved the use of a solution of a salt, of either iron, usually the nitrate, or magnesium, or of both, as the source of oxide in the catalyst. Furthermore, these former methods have involved a mixing of materials containing a salt of one or the other of those metals and substantial quantities of water at some stage of the process of making the catalysts. The mixture was then heated to decompose the salts and form the oxides. Carrying out a process of this type on a commercial scale involved an expensive installation of apparatus for the drying and decomposing operations, particularly for the recovery of nitric acid from the oxides of nitrogen liberated in the decomposition of the nitrates, and even then the nitric acid recovery was incomplete and considerable amounts of the costly acid were lost in producing the catalyst. Furthermore, the decomposed material has highly abrasive properties and when compressed or tabletted to form compacts, tends to block the movement of the punches of the tabletting machine and is destructive of the dies and molds.

It has now been discovered that suitable catalysts may be prepared directly from commercial iron oxide and commercial magnesium oxide, for example, calcined magnesite, without necessitating an intermediate stage of converting one or the other, or both, into salts. As a result of this discovery, the production of the catalysts is facilitated and cheapened. For example, the relatively expensive iron nitrate or magnesium nitrate heretofore used, is replaced by inexpensive commercial iron oxide or commercial magnesium oxide. Furthermore, the difficulties in tabletting the material have been met by incorporating a lubricant such as gasoline or flake graphite with the material prior to the tabletting operation. The product is a highly satisfactory catalytic agent, with respect to its catalytic properties and other desirable qualities such as porosity resistance to disintegration during use, and heat resistance.

The following example of a preferred method of making a catalyst is given as descriptive of the manner in which the new catalysts may be prepared.

The materials recommended for the catalyst are high grade commercial iron oxide, commercial magnesium oxide, and potassium dichromate. Analyses of iron oxide and commercial magnesium oxide prepared by calcining magnesite which have been found particularly suitable are as follows:

Red iron oxide
($Fe_2O_3$)

| | Per cent |
|---|---|
| Moisture | 0.27 |
| $Fe_2O_3$ | 99.30 |
| S | 0.12 |
| CaO | nil |
| $SiO_2$ | 0.30 |

Calcined magnesite
(MgO)

| | Per cent |
|---|---|
| Loss on ignition | 3–7 |
| MgO | 86–90 |
| $SiO_2$ | 4.61 |
| CaO | 1.31 |
| $Fe_2O_3$ | 0.26 |

Care should be taken to avoid "dead burned" materials by selecting those prepared at low temperatures. By the term "commercial" as applied to iron oxide and magnesium oxide, it is intended to refer to a material which is distinguished by a content of impurities or foreign material substantially that given in the above examples or greater. The relative amounts of the individual impurities may vary. For example, it has been found that larger quantities of sulfur than the 0.12% of the example do not have a deleterious effect on the catalyst. The presence of silica in the iron oxide is to be avoided although it appears that silica in the magnesium oxide is much less harmful to the catalytic activity. Materials having an impurity content harmful to the catalytic and desirable physical properties of the material should be avoided.

The successful production of a uniform catalyst with long life and high activity by the present process depends to a considerable extent upon a thorough mixing of the materials. The iron oxide and magnesium oxide should, therefore, be in particles of relatively small size such that they may be intimately admixed with one another. A material which passes through a 200 mesh screen has been found satisfactory. In large-scale production of the catalyst, for example when batches of about 150 lbs. and upwards (on a dry basis) of the materials are to be used, the iron oxide and the magnesium oxide in a dry condition are thoroughly mixed, which may be accomplished in a mechanical mixer. These two materials are preferably used in the proportion of about 30 parts of dry iron oxide to about 67 parts of dry magnesium oxide. A water solution containing about 3 parts of potassium dichromate is then slowly added to and incorporated with the mixed dry materials with thorough stirring between additions and with final stirring after the entire amount of solution is added to promote a granulation of the mixture. The quantity of water in which the potassium dichromate added to the dry mixture is dissolved is important, since too little water gives poor granulation and too much makes granulation difficult and increases the cost of the drying operation which the material subsequently undergoes. About 90 pounds of water has been found to be a suitable quantity for a batch of 300 pounds of dry iron oxide and magnesium oxide.

The material as it comes from the mixer varies in consistency from a semi-paste to various sized lumps, depending upon the amount of water employed. After drying, if necessary, granulation of the material is completed by any of the well known means therefor.

The granulated material is dried, preferably at a temperature below about 200° C., and preferably not higher than about 140° C. until the water content is not more than about 5% and the dried material run through a screen to break up large lumps, if this be necessary or desirable for the subsequent operation. Higher temperatures may be used but, with higher temperatures, the danger of affecting the granulating and tabletting properties of the material and the catalytic activity of the final product increases. A quantity of flake graphite equivalent to about 0.3% of the weight of the material is added and thoroughly stirred in and the mixture compressed under pressure to form coherent compacts; for example, the mixture may be tabletted as described in U. S. P. No. 1,680,807, dated August 28, 1928, to William Schultze. In thus mechanically compacting the material in an automatic tablet-forming machine an autogenous bond is formed betwen the relative non-coherent particles, which bond is independent of any cohesive action of the lubricant. The graphite serves to reduce the abrasiveness of the material and to lubricate the dies and punches of the tabletting machine. It has been found that the graphite has essentially no effect on the catalyst activity. Other lubricants may be used, such as gasoline, aluminum powder, stearic acid or palmitic acid. By this procedure the entire interior, as well as the exterior surface of the tablet, is lubricated. The lubricant is effective on the individual granules as they are rubbed against each other during the compression of the tabletting operation.

The product of the process as described, is a material containing iron oxide, magnesium oxide as such or in hydrated form, and potassium and chromium in combined form together with a quantity of graphite or other lubricant. When in storage the catalyst should preferably be protected from moisture and carbon dioxide and from conditions which might cause it to deteriorate either chemically or physically.

As hereinabove described, the tabletted catalyst is substantially dry. It, however, contains considerable water which has combined with the magnesia. This water of hydration is evolved when the tablets are subjected to higher temperature conditions such as prevail during the use of the catalyst for the reaction between carbon monoxide and steam when the temperature may be, for example, from 450° C. to 575° C. A catalyst of the type hereinabove described loses about 20% in weight when so heated which corresponds to about 65-70% of the magnesia being in hydrated form, while the change in volume is only about 5%. The water used in the preparation of the catalyst may, therefore, be considered as performing a double function—for granulation and for hydration of the magnesia—and the dehydration of the material after converting it into tablet form increases its porosity. My invention accordingly comprises the production of a catalyst in compact or tabletted form containing an ingredient adapted to be decomposed by subsequent treatment without destruction of said form. A catalyst is produced which, because of its compacted or tablet form, is physically rugged and resistant to disintegration and at the same time is relatively porous thereby permitting intimate contact between the catalyst material and the gases to be catalyzed.

Numerous modifications in the method of preparation of this catalyst as described above, may be made without departing from the scope of my invention as defined in the claims. For example, when relatively small batches of catalyst are to be prepared, a thin paste of the iron oxide and potassium dichromate solution may be made, with a subsequent addition and incorporation of the magnesium oxide. This modification of the preferred process is particularly applicable when less than about 150 pounds of the iron oxide and magnesium oxide (on a dry basis) are treated in a single batch.

While I have described my invention with particular reference to the use of potassium dichromate and calcined magnesite in conjunction with the iron oxide, the invention is not limited to this embodiment. Other suitable promoters may, of course, be substituted for the potassium dichromate, for example, potassium permanganate. Similarly, it is to be understood that the invention is not limited to the use of calcined magnesite but that other inert or refractory oxides such as calcium oxide which act like the magnesium oxide as a carrier or stabilizer for the iron oxide catalyst material, may be substituted therefor. On the other hand, the refractory oxide may be omitted altogether although, in such cases, the catalyst is materially less resistant to high temperature conditions.

When in the claims the terms "catalyst" or "catalytic material" are employed, it is intended to refer to a body of material or a material which, when contacted with the gases under appropriate conditions, functions either without further change or after changes induced by the conditions under which it is contacted with the gases, to catalyze a chemical reaction of said gases or to the material after such changes.

I claim:

1. In the process of producing a catalyst compact for use in the production of hydrogen and carbon dioxide from carbon monoxide and water vapor, the step which comprises compressing a mixture of flake graphite with an iron oxide containing catalytic material under pressure to form coherent compacts.

2. The process of producing a catalyst for the production of hydrogen and carbon dioxide by the reaction of carbon monoxide and water vapor, which comprises intimately mixing commercial iron oxide and magnesium oxide, and a water solution of potassium dichromate in the ratio of about 30 parts iron oxide, about 67 parts magnesium oxide, and about 3 parts potassium dichromate, granulating the mixture, drying the granulated material at a temperature of not over about 200° C. incorporating a lubricant with the dried material and compressing the lubricant-containing material under pressure to form coherent compacts.

3. A compressed catalyst compact comprising iron oxide, magnesium oxide, chromium and potassium in combined form and flake graphite.

4. A compressed catalyst compact for use in the production of hydrogen and carbon dioxide from carbon monoxide and water vapor which comprises a mixture of commercial iron oxide, hydrated magnesium oxide, potassium dichromate and flake graphite in the form of compressed compacts.

5. A compressed catalyst compact comprising iron oxide and flake graphite.

6. The process for the production of hydrogen and carbon dioxide which comprises passing a mixture of carbon monoxide and water vapor in contact with a catalyst compact in the preparation of which commercial iron oxide, commercial magnesium oxide and water are intimately mixed, said water being present in the resulting mixture in amount sufficient to hydrate a major proportion of the magnesium oxide, and the mixture dried.

7. The process for the production of hydrogen and carbon dioxide which comprises passing a mixture of carbon monoxide and water vapor in contact with a catalyst compact in the preparation of which commercial iron oxide and magnesium oxide, potassium dichromate and water are intimately mixed, said water being present in the resulting mixture in amount sufficient to hydrate a major proportion of the magnesium oxide, and the mixture dried at a temperature of not over about 200° C.

8. In a process of reacting carbon monoxide and water vapor to produce carbon dioxide and hydrogen in the presence of a catalyst, the improvement which comprises producing the catalyst by mixing finely divided separately prepared iron oxide and magnesium oxide in the presence of water in amount sufficient to hydrate a major proportion of the magnesium oxide and forming the mixture into catalyst compacts.

9. In a process of reacting carbon monoxide and water vapor to produce carbon dioxide and hydrogen in the presence of a catalyst, the improvement which comprises producing the catalyst by mixing finely divided separately prepared iron oxide and a refractory oxide which combines with water to form a hydrate and water in amount sufficient to hydrate a major proportion of the said refractory oxide, forming the mixture into agglomerates consisting of coherent masses of a uniform mixture of fine particles of the catalyst components, and heating the agglomerates at a temperature at which said hydrated refractory oxide is dehydrated without destruction of said agglomerates.

10. In a process of reacting carbon monoxide and water vapor to produce carbon dioxide and hydrogen in the presence of a catalyst, the improvement which comprises producing the catalyst by intimately mixing separately prepared iron oxide and magnesium oxide, potassium dichromate and water in amount sufficient to hydrate a major proportion of the magnesium oxide, drying the mixture at a temperature not over about 200° C. and compressing the dried material under pressure to form coherent compacts.

11. In a process of reacting carbon monoxide and water vapor to produce hydrogen and carbon dioxide in the presence of a catalyst, the improvement which comprises producing the catalyst by intimately mixing separately prepared finely divided iron oxide containing more than 0.4% impurities (in addition to the moisture contained therein) and a refractory oxide containing more than 6% impurities (in addition to material lost on ignition) and compressing the mixture to form coherent compacts.

12. In a process of reacting carbon monoxide and water vapor to produce carbon dioxide and hydrogen in the presence of a catalyst, the improvement which comprises producing the catalyst by intimately mixing separately prepared finely divided iron oxide and magnesium oxide with water in amount sufficient to hydrate a major proportion of the magnesium oxide, compressing the mixture to form coherent compacts and heating said compacts to a temperature at which said hydrated oxide is decomposed without destruction of said compacts.

13. In a process of reacting carbon monoxide and water vapor to produce carbon dioxide and hydrogen in the presence of a catalyst, the improvement which comprises producing a catalyst by intimately mixing separately prepared finely divided iron oxide, a refractory oxide and a lubricant and compressing the lubricant-containing mixture under pressure to form coherent compacts.

EUGENE D. CRITTENDEN.